United States Patent
Suzuki

[11] Patent Number: 5,867,472
[45] Date of Patent: Feb. 2, 1999

[54] SUPPORTING MECHANISM FOR VEHICLE MOUNTING APPARATUS

[75] Inventor: Tokio Suzuki, Iwaki, Japan

[73] Assignee: Alpine Electronics, Inc., Tokyo, Japan

[21] Appl. No.: 829,963

[22] Filed: Apr. 1, 1997

[30] Foreign Application Priority Data

Apr. 25, 1996 [JP] Japan .................................. 8-104917

[51] Int. Cl.$^6$ ................................................ G11B 23/00
[52] U.S. Cl. ........................................................ 369/263
[58] Field of Search ............................ 369/263; 217/54; 267/140.4; 1/136; 206/521; 312/319.1

[56] References Cited

U.S. PATENT DOCUMENTS

| | | | |
|---|---|---|---|
| 2,397,804 | 4/1946 | Nakken et al. | 248/574 |
| 4,731,777 | 3/1988 | Yoshitoshi et al. | 369/263 |
| 5,042,024 | 8/1991 | Kurosawa et al. | 369/75.1 |
| 5,410,533 | 4/1995 | Ohsaki et al. | 369/263 |
| 5,595,430 | 1/1997 | Weyeneth | 312/319.1 |

Primary Examiner—Stuart S. Levy
Assistant Examiner—David D. Davis
Attorney, Agent, or Firm—Brinks Hofer Gilson & Lione

[57] ABSTRACT

A supporting mechanism for a vehicle mounting apparatus including a housing settable in a first posture and a second posture. In the first posture, a line extending along a predetermined direction is oriented in the direction of gravitational force. In the second posture, a line intersecting the line extending along the predetermined direction is oriented in the direction of gravitational force. The vehicle mounting apparatus further includes an apparatus body accommodated in the interior of the housing. The supporting mechanism includes a plurality of springs which resiliently connect the apparatus body to the housing. When the housing is in the first and second postures, at least two of the plurality of springs support the apparatus body with respect to the direction of gravitational force, and points connecting the two springs and the apparatus body are disposed on opposite sides of a vertical line passing through the center of gravity of the apparatus body. Therefore, the apparatus body, which does not easily tilt in either of the two housing postures, is stably resiliently supported.

19 Claims, 6 Drawing Sheets

SUPPORTING MECHANISM FOR VEHICLE MOUNTING APPARATUS

BACKGROUND OF THE INVENTION

1. Field of the Invention

The present invention relates to a supporting mechanism for a vehicle mounting apparatus (such as a vehicle magazine mounting-type disk apparatus (disk changer)), in which the vehicle mounting apparatus body is resiliently supported by springs in the housing, and, more particularly, to a supporting mechanism for a vehicle mounting apparatus, which stably supports the vehicle mounting apparatus body placed in two different postures so as to be oriented in different directions.

2. Description of the Related Art

The body of a vehicle mounting apparatus is resiliently supported in the housing to prevent vibration of a vehicle body, when exerted on the housing, from being directly exerted on the vehicle mounting apparatus body, in order to allow stable operation of, for example, a disk drive mechanism in the vehicle mounting apparatus body.

FIG. 5 is a schematic view of a magazine-type disk apparatus (disk changer), taken as an example of a vehicle mounting apparatus, as viewed from an end face of the apparatus.

Referring to FIG. 5, a vehicle mounting apparatus body 2 is accommodated in a housing 1. A magazine with a plurality of disks is inserted in direction A into the vehicle mounting apparatus body 2. A disk drive section 3, which moves in the Y directions, is provided in the vehicle mounting apparatus body 2. The disk drive section 3 moves in the Y direction in the vehicle mounting apparatus body 2 to allow selection of any one of the disks in the magazine, and stops in front of the selected disk in the magazine from where the selected disk is drawn out for mounting it to the disk drive section 3 which drives the disk.

The vehicle mounting apparatus body 2 is supported by a plurality of (pulling) springs 4a and 4b in the housing 1. In the conventional example shown in FIG. 5, points connecting the plurality of springs 4a and 4b to the vehicle mounting apparatus body 2 are designated 2a, points connecting the two springs 4a to the housing 1 are designated 1a, and the points connecting the two springs 4b to the housing 1 are designated 1b. More specifically, the end face of the vehicle mounting apparatus body 2 is supported in the housing 1 by the four springs 4a and 4b. The opposite end face of the vehicle mounting apparatus is similarly supported by four springs 4a and 4b.

The four springs are disposed such that two of the springs 4a and 4b and the other two springs 4a and 4b extend vertically so as to be symmetrical to and disposed on opposite sides of an axis Xg passing through the center of gravity G of the vehicle mounting apparatus body 2 of FIG. 5. In FIGS. 5 and 6, the pulling force of the two springs 4a is designated Fa, the force component of the force Fa in the direction of the axis Xg is designated Fa1, and the force component of the force Fa in the direction of axis Yg is designated Fa2. The pulling force of the other two springs 4b is designated Fb, the force component of the force Fb in the direction of the axis Xg is designated Fb1, and the force component of the force Fb in the direction of the axis Yg is designated Fb2.

The disk apparatus can be placed in two postures which are selectable by the user. It can be placed in a first posture in which the axis Yg is oriented in the direction of the center of gravity, as shown in FIG. 5, or in a second posture in which the axis Xg is oriented in the direction of the center of gravity, as shown in FIG. 6.

In the disk apparatuses shown in FIGS. 5 and 6, two of the springs 4a and 4b and the other two springs 4a and 4b are symmetrically disposed to the axis Xg, so that when the disk apparatus is in the first posture of FIG. 5, the force components Fa1 and Fb1 in the horizontal direction are virtually in equilibrium, which is also true for the force components Fa2 and Fb2 in the vertical direction. When the disk apparatus is in the second posture of FIG. 6, the force components Fa2 and Fb2 in the horizontal direction are virtually in equilibrium, which is also true for the force components Fa1 and Fb1 in the vertical direction.

Therefore, it is unnecessary to change the spring extension directions and extension positions, when the user uses the disk apparatus in the first posture of FIG. 5 and in the second posture of FIG. 6.

The supporting mechanisms of the conventional magazine selecting type disk apparatuses of FIGS. 5 and 6 have the following problems:

(1) In the first posture, the vertical force component Fa2 (FIG. 5) of the pulling force of the associated spring 4a connected to the vehicle mounting apparatus body 2 is substantially in equilibrium with the vertical force component Fb2 (FIG. 5) of the pulling force of the associated spring 4b. In the second posture, the vertical force component Fa1 (FIG. 6) of the pulling force of the associated spring 4a connected to the vehicle mounting apparatus body 2 is virtually in equilibrium with the vertical force component Fb1 (FIG. 6) of the pulling force of the associated spring 4b. Therefore, in both of the postures of FIGS. 5 and 6, there is a decrease in the elastic supporting force which opposes the gravitational force to suspend the vehicle mounting apparatus body 2, so that the device body 2 has a greater tendency to fall in the direction of gravitational force. Consequently, when a vibration with a large vertical amplitude is exerted on the housing 1, the vehicle mounting apparatus body 2 tends to hit the bottom surface of the housing 1, and is thus scratched more often.

(2) In the second posture of FIG. 6, the points 2a, 2a connecting the springs 4a and 4b to the vehicle mounting apparatus body 2 are located on the vertical line (or axis Xg) passing through the center of gravity G. Since the supporting points of the springs 4a and 4b to the vehicle mounting apparatus body 2 are located on the vertical line (axis Xg) passing through the center of gravity G, the vehicle mounting apparatus body 2 in the posture of FIG. 6 is unstable in the rotational directions designated α and β in FIG. 6. Therefore, for example, when the disk drive section 3 moves in the Y directions in the vehicle mounting apparatus body 2 in order to select a disk and the center of gravity of the vehicle mounting apparatus body 2 is shifted either toward the left or right of the axis Xg, the vehicle mounting apparatus body 2 tends to tilt in the direction in which the center of gravity is tilted, either toward the α or β directions. When the vehicle mounting apparatus body 2 tilts in the housing 1 and an external vibration is exerted on the body 2, the body 2 tends to hit an inner wall of the housing 1. In addition, it becomes difficult to mount the magazine into the vehicle mounting apparatus body 2 in direction A, since the opening of the vehicle mounting apparatus body 2 is tilted.

(3) In the disk apparatuses of FIGS. 5 and 6, the magazine is mounted into the vehicle mounting apparatus body 2 from direction A, with the force component Fa1 being substantially in equilibrium with the force component Fb1 along direction A, so that when the magazine is mounted into the vehicle mounting apparatus body 2 in direction A, the inserting force causes the vehicle mounting apparatus body 2 to move along the axis Xg more easily. This results in poor tactile feel during magazine insertion operations.

SUMMARY OF THE INVENTION

To overcome the above-described problems, an object of the present invention is to provide a supporting mechanism for a vehicle mounting apparatus in which when the housing is placed in the first and second postures, the vehicle mounting apparatus body is stably supported, and does not easily tilt, even when its center of gravity is shifted.

To this end, according to the present invention, there is provided a supporting mechanism for a vehicle mounting apparatus. The vehicle mounting apparatus includes a vehicle mounting apparatus body which is accommodated in a housing so as to be suspended from and supported by the housing by a plurality of springs. The housing is set in a first posture in which a line (just plane) extending in a predetermined direction is oriented in the direction of gravitational force. The housing is also set in a second posture in which a line (just plane) intersecting the line extending in the predetermined direction is oriented in the direction of gravitational force. When the housing is in either of the aforementioned first and second postures, at least two of the aforementioned plurality of springs support the vehicle mounting apparatus body with respect to the direction of gravitational force, and points connecting the aforementioned two springs to the vehicle mounting apparatus body are located on opposite sides of a vertical line passing through the center of gravity.

In either of the aforementioned postures, it is preferable that at least two of the springs pull obliquely and upward and that the horizontal force components of the pulling forces are in opposite directions.

According to the present invention, when the housing is in either of the first and second postures, at least two of the plurality of springs exert upward resilient forces on the vehicle mounting apparatus body. Therefore, when the housing is in either of the first and second postures, the vehicle mounting apparatus body is stably supported by the springs with respect to the gravitational force direction. In addition, the vehicle mounting apparatus body, which is supported on opposite sides of the vertical line passing through the center of gravity in the direction of gravitational force, is stably supported, when a force is applied in a rotational direction. Therefore, even when the disk drive mechanism moves in the vehicle mounting apparatus body and the center of gravity of the body is shifted horizontally, such as in a magazine mounting-type disk apparatus (disk changer), tilting of the vehicle mounting apparatus body is prevented.

In either of the first and second postures, when at least two of the springs extend obliquely upward in opposite directions, the vehicle mounting apparatus body is stably supported in both the gravitational force and horizontal directions.

It is preferable that the spring crosses either the horizontal or vertical lines passing through the center of gravity. Such a construction allows a sufficiently long spring to be mounted along the direction of the height (or along the shorter dimension), and to use an optimum spring constant in which the resilient force changes very little with respect to the distance the vehicle mounting apparatus body moves due to vibration.

In the foregoing description, an opening is formed in the vehicle mounting apparatus body for inserting therein a recording medium. It is preferable that the sum of the pulling force components acting in a direction opposite to the direction of insertion of the recording medium is greater than the sum of the pulling force components acting in the direction of insertion of the recording medium. In such a construction, when the number of springs whose force components are exerted in the direction of insertion of the recording medium is the same as the number of springs whose force components are exerted in a direction opposite to the direction of insertion of the recording medium, the elastic forces of the springs are set such that the sum of the force components of the latter springs are greater than the sum of the force components of the former springs; or a larger number of springs whose force components are exerted in a direction opposite to the direction of insertion is used compared to the number of springs whose force components are exerted in the same direction as the direction of insertion of the recording medium.

By virtue of such a construction, when a recording medium is inserted into the vehicle mounting apparatus body, the vehicle mounting apparatus body is not moved by the inserting force exerted thereto, thereby allowing stable insertion of the recording medium. A single recording medium or a magazine containing a plurality of recording media may be inserted into the vehicle mounting apparatus body.

DESCRIPTION OF THE PREFERRED EMBODIMENT

Figure 1:
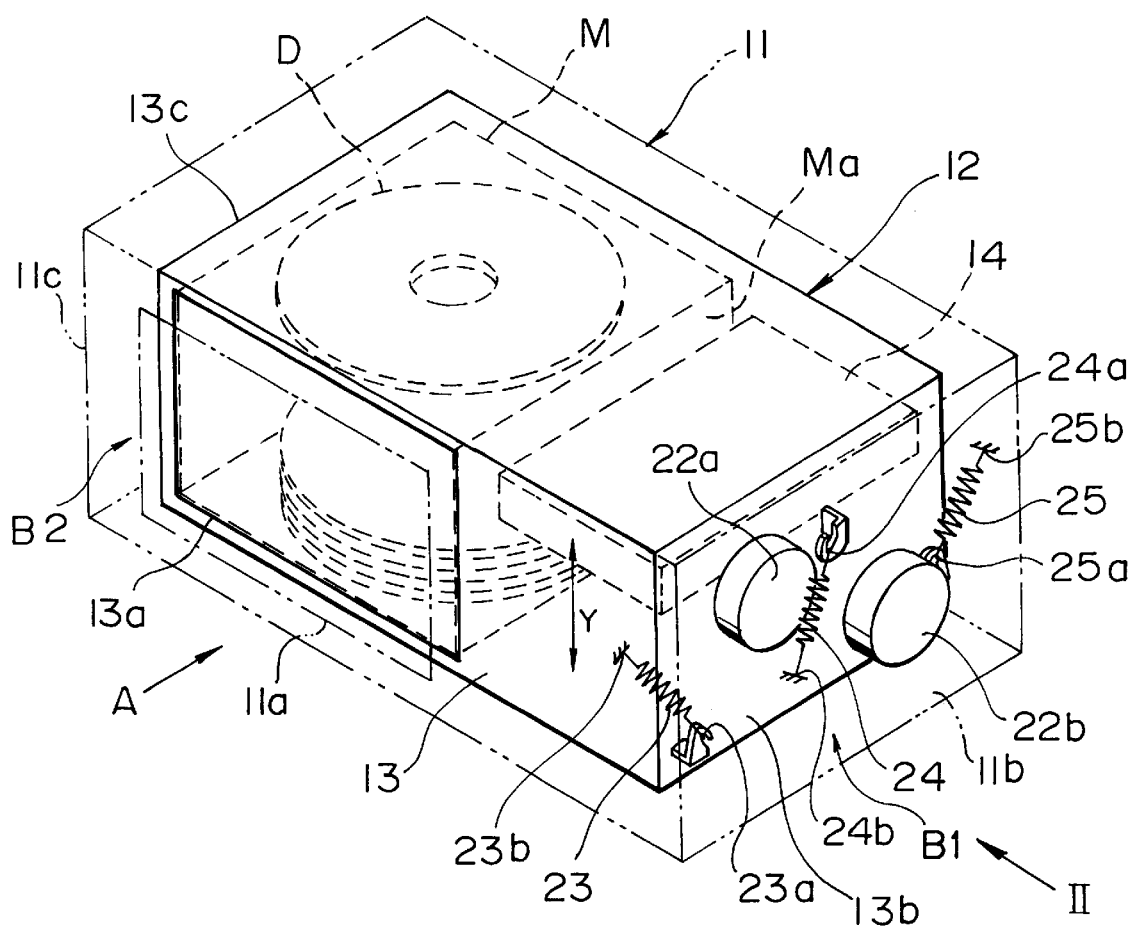
FIG. 1 is a view of a supporting mechanism for a magazine mounting type disk apparatus, with the disk apparatus being used as an example of the vehicle mounting apparatus of the present invention.
Figure 2:
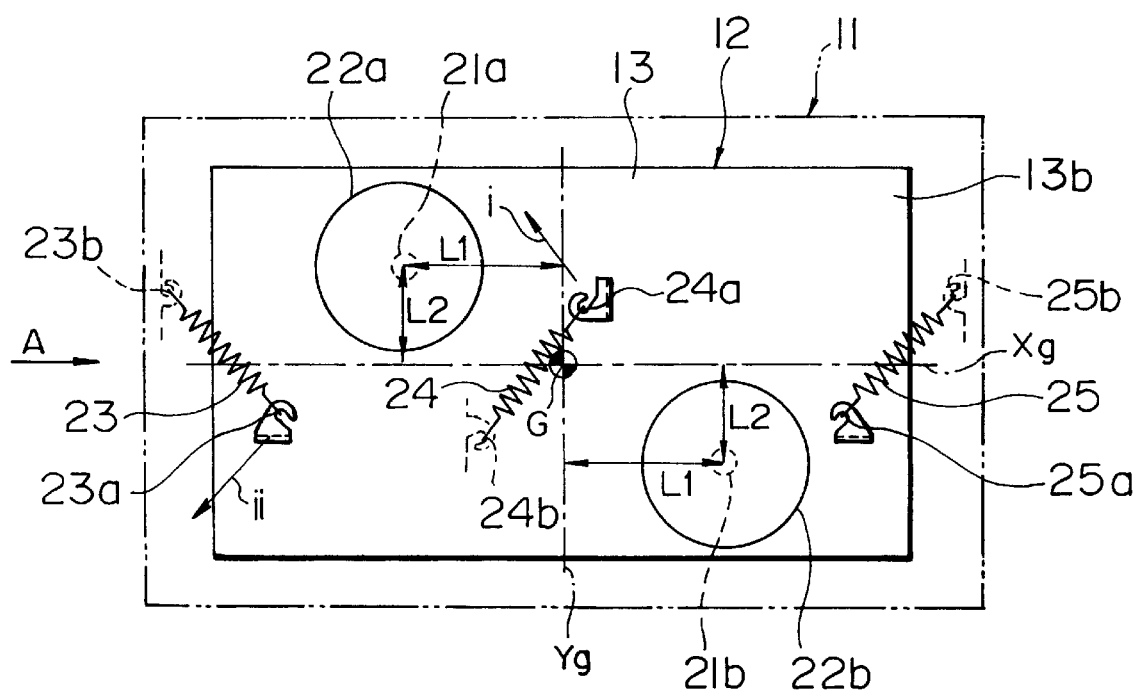
FIG. 2 is an end view as viewed from the direction of arrow II of FIG. 1.
Figure 3:
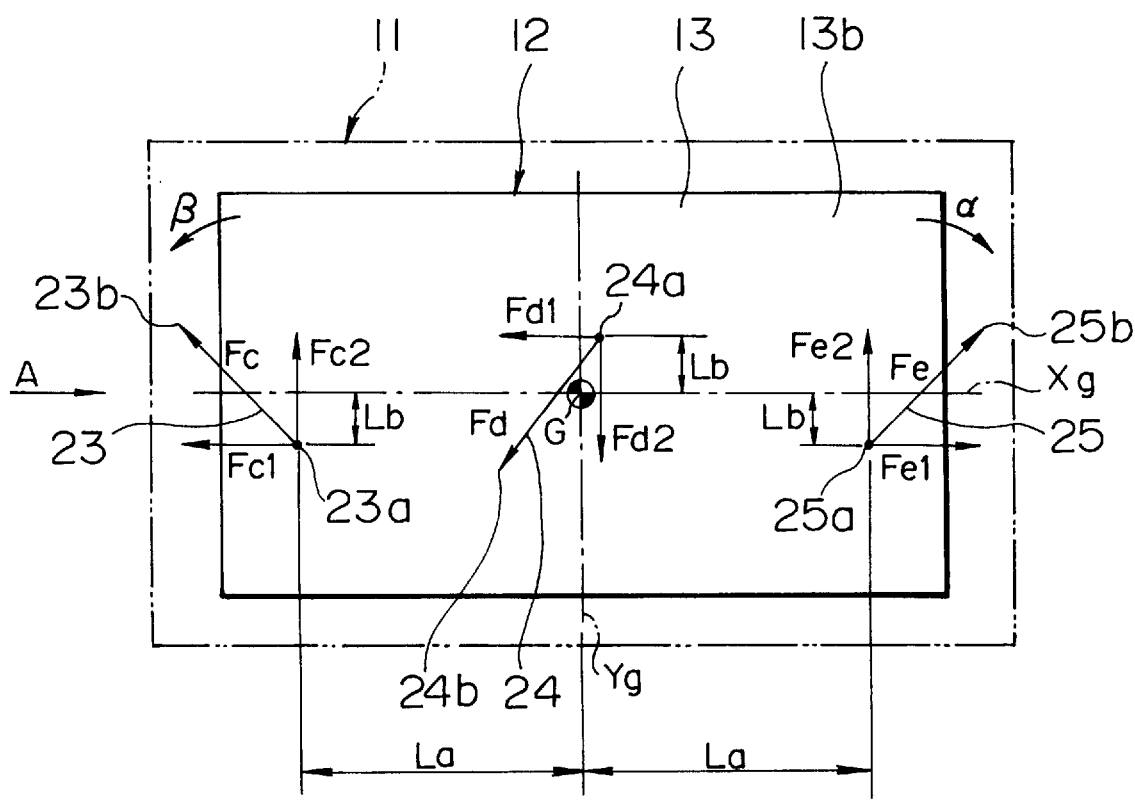
FIG. 3 is a view of the vehicle mounting apparatus body, in a first posture, being supported.
Figure 4:
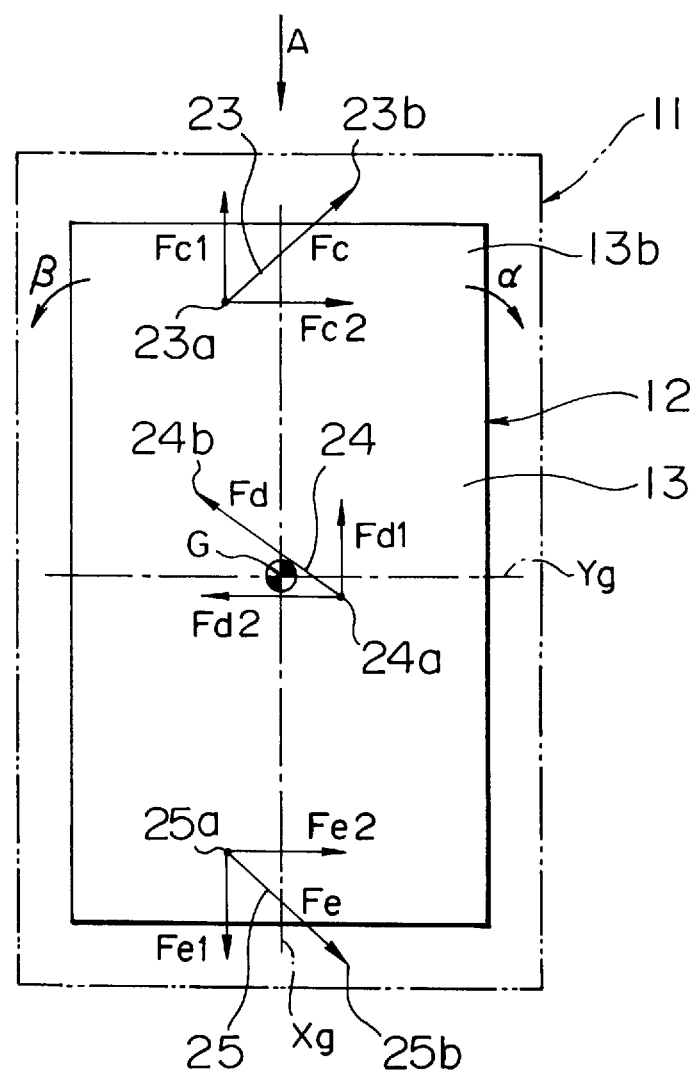
FIG. 4 is a view of the vehicle mounting apparatus body, in a second posture, being supported.
Figure 5:
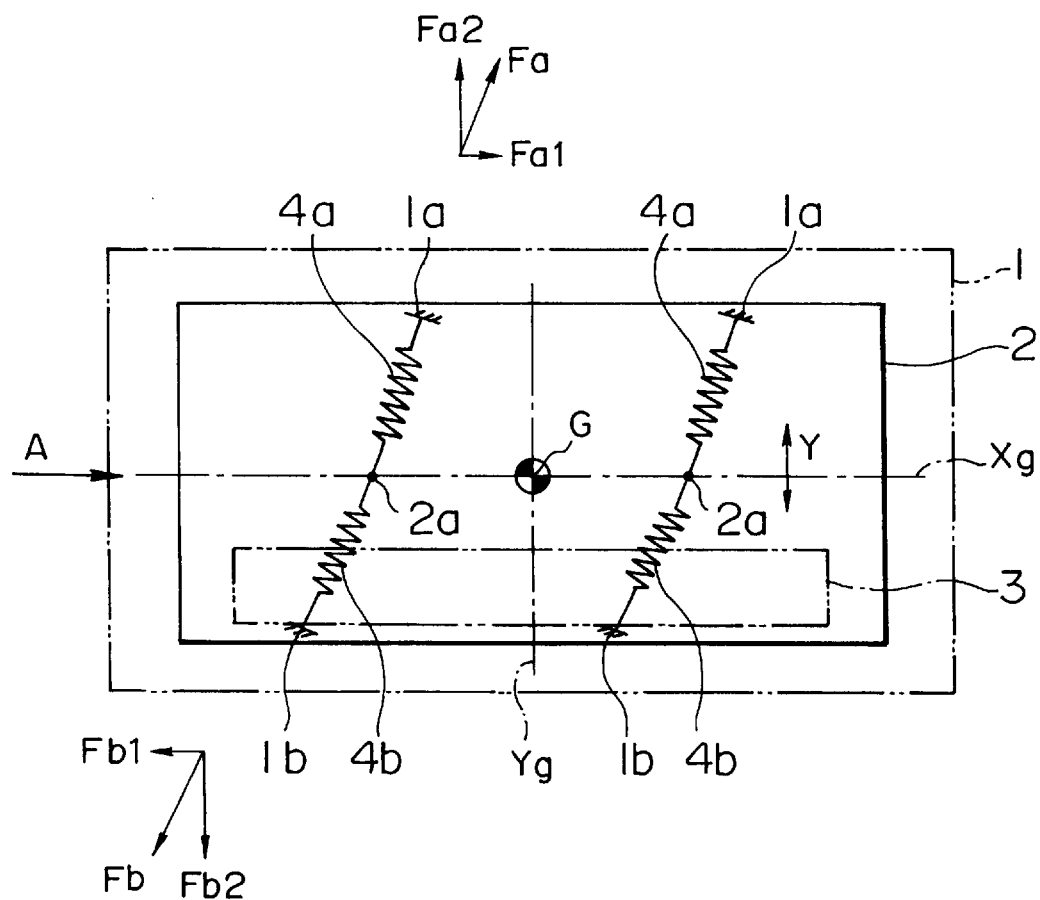
FIG. 5 is an end view of a conventional supporting mechanism for a vehicle mounting apparatus in a first posture.
Figure 6:
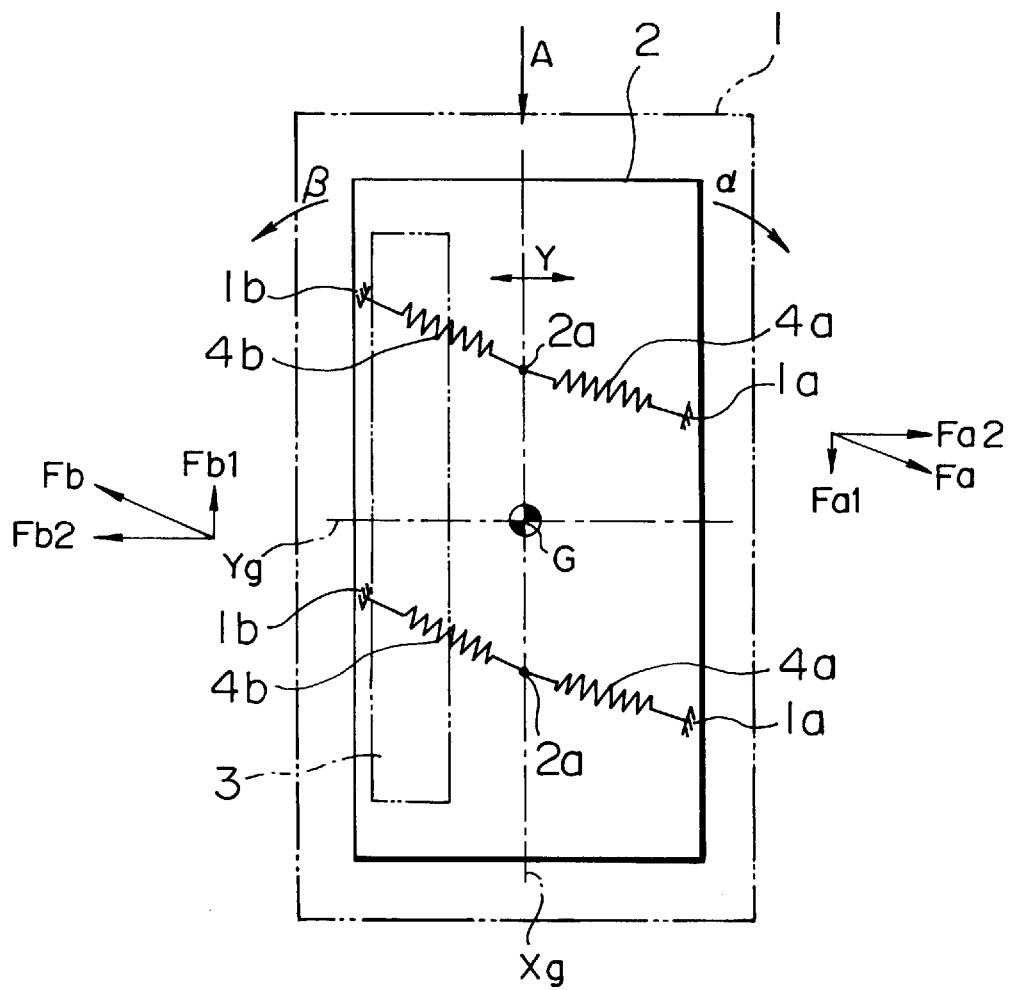
FIG. 6 is an end view of the conventional supporting mechanism for the vehicle mounting apparatus in a second posture.

FIG. 1 is a perspective view of a supporting mechanism for a vehicle magazine mounting type disk apparatus (disk changer), with the disk apparatus being used as an example of the vehicle mounting apparatus of the present invention. FIG. 2 is an end view as viewed from the direction of arrow II of FIG. 1. FIG. 3 is a view of the vehicle mounting apparatus body, in a first posture, being supported. FIG. 4 is a view of the vehicle mounting apparatus body, in a second posture, being supported.

Referring to FIG. 1, reference numeral 11 denotes a housing, forming the exterior of the supporting mechanism, which contains therein a vehicle mounting apparatus body 12. The apparatus body 12 is provided with a body chassis 13 having a volume which is slightly smaller than the internal volume of the housing 11 and has various mechanical portions incorporated therein.

An opening 13a is formed in the body chassis 13, while an opening 11a, which communicates with the opening 13a and is provided with a door (not shown), is formed in the housing 11. With the door opened, a magazine M is mounted into the body chassis 13 by inserting it in direction A into the opening 11a and then into the opening 13a. The magazine M contains a plurality of disks D, such as compact disks, and has an opening Ma at the right side as viewed in the magazine inserting direction A.

A disk selection/drive section 14 is provided facing the opening Ma of the magazine M. A mechanism (not shown) is provided to drive the disk selection/driving section 14 vertically in the directions of the double-headed arrow Y of FIG. 1. The section 14, when driven vertically as indicated by the double-headed arrow Y, causes selection of any one of the disks in the magazine M, and then stops in front of the selected disk D. When the section 14 stops, the selected disk is drawn out from the opening Ma of the magazine M by an amount which is slightly longer than half the disk's entire length, with the center of the disk D being clamped to a rotating table in the disk selection/drive section 14. The disk D, clamped to the rotating table, is rotationally driven in the disk selection/drive section 14 having an optical head which reads signal data recorded on the disk D.

As shown in FIG. 1, a resilient supporting mechanism Bl, which resiliently supports the apparatus body 12, is provided between the end face 13b of the body chassis 13 provided for the apparatus body 12 and the side end face 11b of the housing 11. A resilient supporting mechanism B2 (not shown), having essentially the same structure as that of the resilient supporting mechanism B1, is also provided between the opposite end face 13c of the body chassis 13 and the opposite end face 11c of the housing 11. The resilient supporting mechanism B1 adjacent to the end face 13b and the resilient supporting mechanism B2 adjacent to the end face 13c support the vehicle mounting apparatus body in the same direction by springs.

Referring to FIG. 2, the center of the end face 13b of the body chassis 13 provided for the vehicle mounting apparatus body 12 is indicated by reference character G. For convenience, the reference character G of FIG. 2, though representing a line passing through the center of gravity at the center of the vehicle mounting apparatus body 12 interior so as to be perpendicular to the end face 13b, will be described as the center of gravity of the vehicle mounting apparatus body 12. In addition, in FIG. 2, Xg represents an axis (just plane) extending horizontally and passing through the center of gravity G, and Yg represents an axis (second plane) extending vertically so as to be perpendicular to the axis Xg and passing through the center of gravity G.

FIGS. 1 to 3 each illustrate the housing 11 in a first posture in which the axis Yg is oriented in the direction of the center of gravity or in the vertical direction. Here, the magazine M is mounted into the vehicle mounting apparatus body 12 as indicated by arrow A of the figures, which is in a horizontal direction. FIG. 4 is a view showing the housing 11 in a second posture in which the axis Xg is oriented in the direction of the center of gravity or in the vertical direction. Here, the magazine M is mounted into the vehicle mounting apparatus body 12 in the direction indicated by arrow A of FIG. 4, which is in a vertically downward direction or in the direction of the center of gravity.

As shown in FIG. 2, a pair of supporting shafts 21a and 21b are fixed to the end face 13b of the body chassis 13, and dampers 22a and 22b are fixed to the inside surface of the side end face 11b of the housing 11. The dampers 22a and 22b are oil dampers consisting of a highly viscous fluid, such as silicon oil, sealed in an elastic (such as a rubber) bag. The supporting shafts are inserted into the dampers 22a and 22b, respectively, in order to resiliently support the vehicle mounting apparatus body 12 in the housing 11.

The supporting shafts 21a and 21b, and the dampers 22a and 22b are disposed obliquely on opposite sides of the center of gravity G. Therefore, when the housing 11 is set in the first posture in which the axis Yg is oriented in the direction of the center of gravity, the resilient supporting points (21a and 22b) of the dampers 22a and 22b are located on both sides of the vertical axis Yg, and are separated by the same distances L1 from the axis Yg, as shown in FIG. 2. When the housing 11 is set in the second posture in which the axis Xg is oriented in the direction of the center of gravity, as shown in FIG. 4 the elastic supporting points (21a and 21b) are located on both sides of the vertical axis Xg, and are separated by the same distances L2 (see FIG. 4 from the axis Xg. Consequently, in both postures, the two dampers 22a and 22b allow the end face 13b to be supported at equal distances from the center of gravity G in the horizontal direction. Accordingly, the vehicle mounting apparatus can be stably supported equally well by means of the dampers 22a and 22b for each of the postures. The resilient supporting mechanism B2 adjacent to the opposite end face 13c has the same damper supporting structure as that of the resilient supporting mechanism B1.

The resilient supporting mechanism B1 is provided with three pulling springs 23, 24, and 25, which are retained at connecting points 23a, 24a, and 23b, respectively, at the end face 13bof the body chassis 13. They are also retained at connecting points 23b, 24b, and 25b, respectively, at the side end face 11b. The springs 23, 24, and 25 apply resilient forces to the vehicle mounting apparatus body 12 at the connecting points 23a, 24a, and 23b, respectively. The points of application of pulling forces to the vehicle mounting apparatus body 12 by the springs 23 and 25, that is the connecting points 23a and 23b, are located on opposite sides of the axis Yg and at equal distances La from the axis Yg. The points of application of pulling forces to the vehicle mounting apparatus body 12 by the springs 23, and 25 and the sign 24, that is the connecting points 23a, and 25a and the connecting point 24a, are located on opposite sides of the axis Xg and at equal distances Lb from the axis Xg.

In FIGS. 3 and 4, the pulling forces and directions of the springs 23, 24, and 25 are represented by vectors Fc, Fd, and Fe, respectively. In addition, the force components in the direction of the axis Xg of the pulling forces Fc, Fd, and Fe, respectively, are represented by Fc1, Fd1, and Fe1, whereas the force components in the direction of the axis Yg of the pulling forces Fc, Fd, and Fe are represented by Fc2, Fd2, and Fe2, respectively.

As shown in FIG. 3, when the apparatus body is in the first posture in which the axis Yg passing through the center of gravity G is oriented in the direction of the gravitational force (or vertical direction), the left and right springs 23 and 25 pull the vehicle mounting apparatus body 12 obliquely upward in different directions along the axis Xg. More specifically, the force components Fc2 and Fe2 of the pulling forces Fc and Fe of the springs 23 and 25 are exerted upward on the vehicle mounting apparatus body 12. These force components are exerted on opposite sides of the axis Yg (passing through the center of gravity) and at equal distances La from the axis Yg. The force component Fd2 of the pulling force Fd of the spring 24 acts downward at a location very close to the axis Yg passing through the center of gravity G. The sum of the force components (FC2+Fe2−Fd2) is such as to pull the vehicle mounting apparatus body 12 upward. In addition, since the pulling forces are exerted upward on opposite sides of the axis Yg and at equal distances La from the axis Yg, the forces acting on the vehicle mounting apparatus body 12 are very well balanced. The sum of the force components (Fc2+Fe2−Fd2) is a positive value, so that an upward force always acts on the vehicle mounting apparatus body 12, thus preventing the vehicle mounting apparatus from falling toward the bottom of the housing 11 by its own weight.

The points of application (23a and 23b) of the upward force components Fc2 and Fe2 are located on the left and right sides of the vertical axis Yg passing through the center of gravity G, whereby the vehicle mounting apparatus body 12 in the first posture of FIG. 3 is prevented from rotating in the α and β directions and thus from tilting.

As shown in FIG. 4, when the housing 11 is set in the second posture in which the axis Xg passing through the center of gravity G is oriented in the direction of the center of gravity (or vertical direction), the springs 23 and 24 pull the vehicle mounting apparatus body 12 obliquely upward, with the upward direction of the pulling forces being in opposite to the directions along the axis Yg.

Therefore, the components Fc1 and Fd1 of the pulling forces Fc and Fd of the springs 23 and 24, respectively, are exerted upward on the vehicle mounting apparatus body 12. The component Fe1 of the pulling force Fe of the spring 25 is exerted downward on a lower portion of the vehicle mounting apparatus body 12 set in the second posture, as shown in FIG. 4. The points of application of the upward force components Fc1 and Fd1, that is the connecting points 23a and 24a, are located on the left and right sides respectively of the vertical axis Xg passing through the center of gravity G and at equal distances Lb from the axis Xg. The point of application of the downward force component Fe1 of the spring 25, or the connecting point 23b, is not located very far from the axis Xg. Therefore, even in the second posture, the sum of the force components (Fc1+Fd1−Fe1) is such as to exert an upward force to the vehicle mounting apparatus body 12 which is well balanced. Since the resultant force (Fc1+Fd1−Fe1) is positive, the vehicle mounting apparatus body 12 is always pulled upward, thereby preventing the vehicle mounting apparatus 12 in the second posture from falling due to its own weight.

When the housing is set in the second posture of FIG. 4, the connecting points 23a and 24a, being the points of application of the upward force components pulling the vehicle mounting apparatus body 12 upwards, are located on opposite sides of the axis Xg (extending in the direction of the gravitational force and passing through the center of gravity G) and at equal distances Lb from the axis Xg. Therefore, the vehicle mounting apparatus body 12 is prevented from rotating in the α and β directions of FIG. 4 and thus from tilting, as a result of which the vehicle mounting apparatus body 12 is stably supported. Accordingly, even if the disk selection/drive section 14 of FIG. 1 moves in the Y directions in the vehicle mounting apparatus body 12, and the center of gravity G of the vehicle mounting apparatus body 12 moves horizontally along the axis Yg in FIG. 4, the center of gravity is located between the connecting points 23a and 24a (or the points of application by the springs 23 and 24, respectively), so that movement of the disk selection/drive section 14 does not cause tilting of the vehicle mounting apparatus body 12 in the housing 11.

In the first posture of FIG. 3 and the second posture of FIG. 4, only the force component Fe1 of the force components of the springs 23, 24, and 25 is in the same direction as the magazine inserting direction, so that the force components Fc1 and Fd1 act in a direction opposite to the inserting direction A. Therefore, when the magazine M is inserted and the vehicle mounting apparatus body 12 is pushed in the inserting direction A, the resistance force becomes large, thereby preventing movement of the vehicle mounting apparatus body 12 during magazine M insertion, and thus giving the operator the proper feel during magazine M insertion.

The springs 23, 24, and 25 are disposed along the width (or shorter dimension or the axis Yg) of the side end face 11b of the housing 11 and the end face 13b of the body chassis 13 so as to cross the axis Xg passing through the center of gravity G. The points 23a and 25a and the point 24a connecting the vehicle mounting apparatus body 12 to the springs 23 and 25 and the spring 24, respectively, and the points 23b and 25b, and the point 24b connecting the springs 23 and 25 and the spring 24, respectively, to the housing 11 are disposed on opposite sides of the axis Xg. Therefore, it is possible to use sufficiently long springs 23, 24, and 25 extending along the direction of the width (or shorter dimension) of the side end face 11b of the housing 11.

More specifically, it is possible, for example, to dispose the springs 23 and 24 such that they extend in direction (i) and direction (ii) of FIG. 2, with the respective connecting points 23a and 24a serving as starting points. In such a case, however, the points connecting the springs 23 and 24 to the housing 11 must be disposed close to the ceiling and the bottom surface, so that when the height of the housing 11 is small as in FIG. 2, it becomes necessary to use short springs 23 and 24. However, as shown in FIG. 2, the springs 23, 24, and 25 can be made longer by allowing them to cross the axis Xg, thereby making it possible to set a proper spring constant in which the elastic force changes very little with respect to the displacement of the vehicle mounting apparatus body 12. In addition, the points connecting the springs to the housing are disposed away from the ceiling and bottom surface, thereby facilitating mounting of the springs to the housing 11.

The direction of arrangement of each of the above-described springs is the same for the elastic supporting mechanism B2 at the other end face 13c of the body chassis 13.

As can be understood from the foregoing description, according to the present invention, the vehicle mounting apparatus body is stably supported in the housing placed in each of the first or second postures. In addition, the vehicle mounting apparatus body is given stability in both of the postures, since the points of application of the spring forces are located on opposite sides of the axis extending vertically through the center of gravity of the vehicle mounting apparatus body, thus preventing tilting of the vehicle mounting apparatus body. Further, it is possible to prevent large movements of the vehicle mounting apparatus body, during insertion of a recording medium into the vehicle mounting apparatus body, by setting a large resistance force for the vehicle mounting apparatus body to allow it to greatly resist the recording medium being inserted.

What is claimed is:

1. A supporting mechanism for a vehicle mounting apparatus including a housing settable in a first posture in which a first plane passing through a center of gravity of the apparatus and extending along a predetermined direction is oriented in a direction of gravitational force, and in a second posture in which a second plane passing through the center of gravity and intersecting the first plane is oriented in the direction of gravitational force, and an apparatus body accommodated in the interior of said housing, said supporting mechanism comprising:

a plurality of springs for resiliently connecting said apparatus body to said housing, each of said plurality of springs being connected between one of a first side end face and a second side end face of said apparatus body and said housing, wherein when said housing is set in the first and second postures, at least two of said plurality of springs support each of the first and second side end faces of said apparatus body with respect to the direction of gravitational force, and wherein connecting points at which the first side end face of said apparatus body is connected to said at least two springs are disposed on opposite sides of said first and second planes in both of the first and second postures and said connecting points of said first side end face do not lie on a line passing through the center of gravity of the apparatus.

2. A supporting mechanism for a vehicle mounting apparatus according to claim 1, wherein the connecting points are disposed at equal distances from the first and second planes in both of the first and second postures.

3. A supporting mechanism for a vehicle mounting apparatus according to claim 1, wherein in both of the first and second postures, said at least two springs apply oblique upward pulling forces to said connecting points, with horizontal pulling force components of said pulling forces applied by said at least two springs being in opposite directions.

4. A supporting mechanism for a vehicle mounting apparatus according to claim 1, wherein said plurality of springs are disposed so as to cross one of said first and second planes.

5. A supporting mechanism for a vehicle mounting apparatus according to claim 1, wherein said apparatus body comprises an opening for receiving a recording medium inserted therein in a direction of insertion, and wherein a sum of pulling force components of said plurality of springs in a direction opposite to the direction of insertion of the recording medium is greater than sum of pulling force components of said plurality of springs in the direction of insertion of the recording medium.

6. A supporting mechanism for a vehicle mounting apparatus according to claim 5, wherein the recording medium comprises a plurality of disks contained in a magazine, and wherein said apparatus body further comprises a driving portion which is movably disposed for selecting any one of the plurality of disks contained in the magazine.

7. A supporting mechanism for a vehicle mounting apparatus according to claim 1, further comprising a plurality of dampers, cooperatively moving with said plurality of springs, which are disposed between one of the first and second side end faces of said apparatus body and said housing, said dampers being disposed on opposite sides of the first and second planes in both of the first and second postures.

8. A supporting mechanism for a vehicle mounting apparatus including a housing settable in a first posture in which a first plane passing through a center of gravity of the apparatus and extending along a predetermined direction is oriented in a direction of gravitational forces, and in a second posture in which a second plane passing through the center of gravity and intersecting the first plane is oriented in the direction of gravitational force, and an apparatus body accommodated in the interior of said housing, said supporting mechanism comprising:

a plurality of springs for resiliently connecting said apparatus body to said housing, each of said plurality of springs being connected between one of a first side end face and a second side end face of said apparatus body and said housing, wherein when said housing is set in the first and second postures, at least two of said plurality of springs support each of the first and second side end faces of said apparatus body with respect to the direction of gravitational force, wherein connecting points at which the first side end face of said apparatus body is connected to said at least two springs are disposed on opposite sides of said first and second planes in both of the first and second postures, and wherein in both of the first and second postures, said at least two springs apply oblique upward pulling forces to said connecting points, with horizontal pulling force components of said pulling forces applied by said at least two springs being in opposite directions.

9. A supporting mechanism for a vehicle mounting apparatus according to claim 8, wherein the connecting points are disposed at equal distances from the first and second planes in both of the first and second postures.

10. A supporting mechanism for a vehicle mounting apparatus according to claim 8, wherein said plurality of springs are disposed so as to cross one of said first and second planes.

11. A supporting mechanism for a vehicle mounting apparatus according to claim 8, wherein said apparatus body comprises an opening for receiving a recording medium inserted therein in a direction of insertion, and wherein a sum of pulling force components of said plurality of springs in a direction opposite to the direction of insertion of the recording medium is greater than sum of pulling force components of said plurality of springs in the direction of insertion of the recording medium.

12. A supporting mechanism for a vehicle mounting apparatus according to claim 11, wherein the recording medium comprises a plurality of disks contained in a magazine, and wherein said apparatus body further comprises a driving portion which is movably disposed for selecting any one of the plurality of disks contained in the magazine.

13. A supporting mechanism for a vehicle mounting apparatus according to claim 8, further comprising a plurality of dampers, cooperatively moving with said plurality of springs, which are disposed between one of the first and second side end faces of said apparatus body and said housing, said dampers being disposed on opposite sides of the first and second planes in both of the first and second postures.

14. A supporting mechanism for a vehicle mounting apparatus including a housing settable in a first posture in which a first plane passing through a center of gravity of the apparatus and extending along a predetermined direction is oriented in a direction of gravitational force, and in a second posture in which a second plane passing through the center of gravity and intersecting the first plane is oriented in the direction of gravitational force, and an apparatus body accommodated in the interior of said housing, said supporting mechanism comprising:

a plurality of springs for resiliently connecting said apparatus body to said housing, each of said plurality of springs being connected between one of a first side end face and a second side end face of said apparatus body and said housing, wherein when said housing is set in the first and second postures, at least two of said plurality of springs support each of the first and second side end faces of said apparatus body with respect to the direction of gravitational force, wherein connecting points at which the first side end face of said apparatus body is connected to said at least two springs are disposed on opposite sides of said first and second planes in both of the first and second postures, and wherein said plurality of springs are disposed so as to cross one of said first and second planes and said connecting points of said first side end face do not lie on a line passing through the center of gravity of the apparatus.

15. A supporting mechanism for a vehicle mounting apparatus according to claim 14, wherein the connecting points are disposed at equal distances from the first and second planes in both of the first and second postures.

16. A supporting mechanism for a vehicle mounting apparatus according to claim 14, wherein in both of the first and second postures, said at least two springs apply oblique upward pulling forces to said connecting points, with horizontal pulling force components of said pulling forces applied by said at least two springs being in opposite directions.

17. A supporting mechanism for a vehicle mounting apparatus according to claim 14, wherein said apparatus body comprises an opening for receiving a recording medium inserted therein in a direction of insertion, and wherein a sum of pulling force components of said plurality of springs in a direction opposite to the direction of insertion of the recording medium is greater than sum of pulling force components of said plurality of springs in the direction of insertion of the recording medium.

18. A supporting mechanism for a vehicle mounting apparatus according to claim 17, wherein the recording medium comprises a plurality of disks contained in a magazine, and wherein said apparatus body further comprises a driving portion which is movably disposed for selecting any one of the plurality of disks contained in the magazine.

19. A supporting mechanism for a vehicle mounting apparatus according to claim 14, further comprising a plurality of dampers, cooperatively moving with said plurality of springs, which are disposed between one of the first and second side end faces of said apparatus body and said housing, said dampers being disposed on opposite sides of the first and second planes in both of the first and second postures.

* * * * *